US006160535A

United States Patent [19]

Park

[11] Patent Number: 6,160,535

[45] Date of Patent: Dec. 12, 2000

[54] LIQUID CRYSTAL DISPLAY DEVICES CAPABLE OF IMPROVED DOT-INVERSION DRIVING AND METHODS OF OPERATION THEREOF

[75] Inventor: Jin-Ho Park, Kyungki-do, Rep. of Korea

[73] Assignee: Samsung Electronics Co., Ltd., Rep. of Korea

[21] Appl. No.: 09/008,396

[22] Filed: Jan. 16, 1998

[30] Foreign Application Priority Data

Jun. 16, 1997 [KR] Rep. of Korea ...................... 97-24848

[51] Int. Cl.[7] ............................ G09G 3/36; G02F 1/1343

[52] U.S. Cl. .............................. 345/153; 345/96; 345/98; 345/100; 345/87; 345/88; 345/90; 349/37; 349/139

[58] Field of Search ................................ 345/88, 89, 87, 345/90, 92, 98, 100, 153

[56] References Cited

U.S. PATENT DOCUMENTS 4,781,438 11/1988 Noguchi .................................... 345/88
5,006,840 4/1991 Hamada et al. .......................... 345/88
5,311,205 5/1994 Hamada et al. .......................... 345/88
5,604,511 2/1997 Ohi ............................................ 345/98
5,648,793 7/1997 Chen ......................................... 345/96
5,748,266 5/1998 Kodate ...................................... 349/39
5,844,534 12/1998 Okumura et al. ......................... 345/90

*Primary Examiner*—Mark R. Powell
*Assistant Examiner*—Ryan Yang
*Attorney, Agent, or Firm*—Myers Bigel Sibley & Sajovec

[57] ABSTRACT

An LCD panel includes a plurality of parallel gate lines and a plurality of parallel data lines on a substrate, the data lines extending transverse to the gate lines. The plurality of data lines cross the plurality of gate lines to define a plurality of pixel regions, the plurality of pixel regions being arranged in a matrix of rows and columns. A plurality of pixel electrodes is disposed on the substrate, a respective one of the pixel electrodes being disposed on a respective one of the pixel regions and electrically connected, for example, by a thin-film transistor (TFT), to a data line such that the pixel electrodes on a column of pixel regions are alternately connected to one of first and second data lines disposed on opposite sides of the column. According to another embodiment, an LCD device includes an LCD panel as described above, coupled to a controller that is responsive to a video signal including a plurality of sequences of video values, e.g., a standard color video signal including a plurality of red, green and blue color values. A respective one of the sequences of video values representing pixels of a respective frame to be displayed during a respective frame period. The controller is configured to drive a data line of the LCD panel during a frame period with plurality of data line voltages that have the same polarity, to thereby operate the LCD panel in a dot inversion fashion. Preferably, the controller is configured to drive a data line with a plurality of data line voltages having a first polarity during a first frame period and with a second plurality of data line voltages having a second polarity during a second frame period.

4 Claims, 7 Drawing Sheets

LIQUID CRYSTAL DISPLAY DEVICES CAPABLE OF IMPROVED DOT-INVERSION DRIVING AND METHODS OF OPERATION THEREOF

FIELD OF THE INVENTION

The present invention relates to liquid crystal display (LCD) devices and methods of operation thereof, and more particularly, to dot inversion LCD devices and methods of operation thereof.

BACKGROUND OF THE INVENTION

Liquid crystal display (LCD) devices have been used in a variety of applications, including calculators, watches, color televisions and computer monitors. Use of LCD devices has been accelerated owing to the advancement of techniques for manufacturing LCD devices, particularly active matrix type devices that utilize thin film transistors (TFTs) to drive pixel elements of the device.

A conventional liquid crystal panel typically includes a pair of transparent glass substrates that are arranged in parallel to define a narrow gap therebetween that is filled with a liquid crystal material. A plurality of pixel electrodes typically are disposed in a matrix on an inner surface of one of the transparent glass substrates, and a plurality of common electrodes corresponding to the pixel electrodes are arranged on the inner surface of the other substrate of the two transparent glass substrates. A liquid crystal cell is defined by opposing pixel and common electrodes. Images are displayed by controlling light transmission through the cell according to a voltage applied to the electrode pair.

In a conventional active matrix LCD device, a plurality of parallel gate lines are formed on one substrate, transverse to a plurality of data lines. A plurality of pixel electrodes is disposed on a corresponding plurality of pixels regions defined by the gate and data lines. A respective thin-film transistor (TFT) is formed on a respective one of the pixel regions, and drives the pixel electrode formed thereon.

FIG. 1A is a plan view of a conventional liquid crystal panel. Gate lines G1–Gm extend transverse to data lines S1–S3*n*, defining pixel regions on which pixel electrodes P and thin film transistors TFT are formed. The TFTs for driving a column of pixel electrodes typically have first controlled electrodes connected to a data line extending along a side of the column, and second controlled electrodes connected to respective pixel electrodes in the column. Voltages are applied from the data lines S1–S3*n* to the pixel electrodes P by selectively driving gate electrodes of the TFTs, which are connected to the gate lines G1–Gm.

Applying voltages having the same polarity to a liquid crystal cell can cause an electrochemical change in the pixel electrode and the common electrode due to precipitation of ionic impurities from the liquid crystal material. This change can significantly reduce display sensitivity and brightness. Accordingly, it is generally desirable to periodically invert the polarity of the voltage applied to the liquid crystal cell in order to prevent this phenomenon.

As illustrated in FIGS. 1B–1C, a conventional dot inversion driving technique involves applying data line voltages that have different polarities to adjacent pixel electrodes, for example, by driving alternating pixel elements with negative (hatched) and positive (no hatching) voltages. Typically, the polarity of the voltages applied to a given pixel electrode is inverted at each frame, as illustrated by FIGS. 1B and FIG. 1C, which illustrate inversion between a first frame (FIG.

1B) and a second frame (FIG. 1C). FIG. 2 illustrates how a data line voltage applied during a frame F inverts with each line period H with respect to a 5V signal used to drive the common electrode of the cell. The data line is driven by voltages from 0V to 10V to provide the appropriate polarity for the pixel electrodes connected thereto. The specified voltage values are used only as examples –0V, 5V and 10V. In actuality, the voltage values depend on panel characteristics.

Although the above-mentioned conventional dot-inversion driving technique may improve display characteristics, such a technique may be disadvantageous because the polarity of the data line voltage is inverted after each horizontal line period. Switching operations typically are required to achieve the inversion, which can lead to undesirably high power consumption. Furthermore, each voltage inversion may require a significant amount of time and may lead to insufficient charging of the cell after each inversion, resulting in poor display performance.

SUMMARY OF THE INVENTION

In light of the foregoing, it is an object of the present invention to provide liquid crystal display (LCD) devices and methods of operation thereof which can provide reduced power consumption.

It is another object of the present invention to provide LCD devices and methods of operation thereof which can provide improved display performance.

These and other objects, features and advantages are provided according to the present invention by LCD devices and methods of operation thereof in which alternating pixel electrodes in a column of an LCD panel are connected to one of first and second data lines on opposites sides of the column. This arrangement allows voltages of single polarity to be applied to a data line during a frame period while still achieving dot inversion. Consequently, large voltage swings in the data line voltages can be reduced, which can lead to reduced power consumption and improved display performance. Preferably, the data line voltages applied to the data lines of the LCD panel are produced by a controller that is responsive to standard red, green and blue color signals produced by a graphics controller such as the type of graphics controllers commonly found in personal computers.

In particular, according to the present invention, an LCD panel includes a plurality of parallel gate lines and a plurality of parallel data lines on a substrate, the data lines extending transverse to the gate lines. The plurality of data lines cross the plurality of gate lines to define a plurality of pixel regions, the plurality of pixel regions being arranged in a matrix of rows and columns. A plurality of pixel electrodes are disposed on the substrate, a respective one of the pixel electrodes being disposed on a respective one of the pixel regions and electrically connected to a data line such that the pixel electrodes on a column of pixel regions are alternately connected to one of first and second data lines disposed on opposite sides of the column. According to a preferred embodiment, a plurality of thin film transistors is formed on the substrate, a respective one of which connects a respective one of the pixel electrodes to a data line such that the pixel electrodes on a column of pixel regions are alternately connected to one of first and second data lines disposed on opposite sides of the column.

According to another embodiment of the present invention, an LCD device includes an LCD panel as described above, coupled to a controller that is responsive to a video signal including a plurality of sequences of video values, a respective one of the sequences of video values representing pixels of a respective frame to be displayed during a respective frame period. The controller is configured to drive a data line of the LCD panel during a frame period with a plurality of data line voltages that have the same polarity, to thereby operate the LCD panel in a dot inversion fashion. Preferably, the controller is configured to drive a data line with a plurality of data line voltages having a first polarity during a first frame period and with a second plurality of data line voltages having a second polarity during a second frame period.

According to an embodiment of the present invention, the controller comprises a data conversion circuit responsive to first, second and third color signals and a line period signal that defines a plurality of line periods, the first, second and third color signals including sequences of first color values, second color values and third color values, respectively, to be displayed during line periods of frame periods. The controller produces a plurality of reformatted color signals from the input signals. The plurality of reformatted color signals includes: a first reformatted color signal which includes interleaved sequences of first color values for a first plurality of line periods and third color values for a second plurality of line periods; a second reformatted color signal which includes interleaved sequences of second color values for the first plurality of line periods and first color values for the second plurality of line periods; and a third reformatted color signal which includes interleaved sequences of third color values for the first plurality of line periods and second color values for the second plurality of line periods. A driving circuit is responsive to the first, second and third reformatted color signals, and produces data line voltages for driving one of the data lines from one of the first, second and third reformatted color signals. The data line voltages applied to the one data line have the same polarity during a frame period.

According to yet another embodiment of the present invention, the driving circuit includes a timing controller which produces buffered first, second and third reformatted color signals, a clock signal, a latch control signal, a frame signal and an output enable signal from the first, second and third reformatted color signals. A shift register circuit is responsive to the buffered first, second and third reformatted color signals and to the clock signal, and includes first, second and third sequences of shift registers which sequentially shift color values of the buffered first, second and third reformatted color signals responsively to the clock signal to produce a plurality of shifted color signals, a respective one of which corresponds to a respective one of the data lines of the LCD panel. A latch is responsive to the plurality of shifted color signals, and latches color values in the plurality of shifted color signals responsively to the latch control signal to produce a plurality of latched color signals, a respective one of which corresponds to a respective one of the data lines of the LCD panel. A gray voltage selector is responsive to the plurality of latched color signals, and produces a plurality of data line voltages responsive to the plurality of latched color signals and to the frame signal. A respective one of the data line voltages corresponds to a respective one of the data lines of the LCD panel and has a voltage level selected from a plurality of gray levels and a polarity determined by the state of the frame signal. An analog buffer, which receives the plurality of data line voltages and applies the plurality of data line voltages to the plurality of data lines of the LCD panel, is responsive to the output enable signal.

Related methods of operating an LCD device as described above are also discussed.

DETAILED DESCRIPTION OF PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1A:
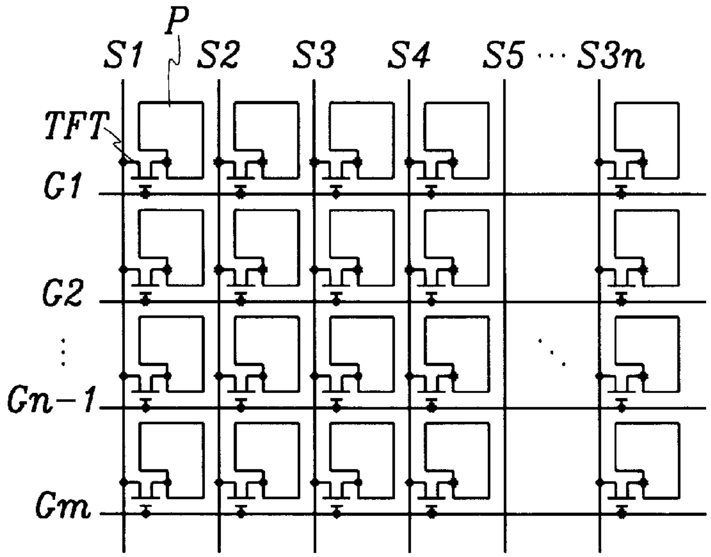
FIG. 1A (Prior Art)
FIG. 1A is a plan view of a conventional liquid crystal display (LCD) panel.
Figure 1B:
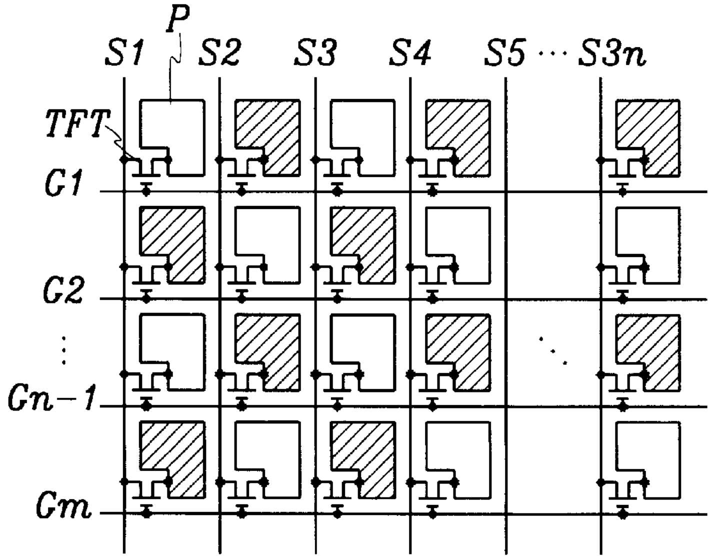
FIG. 1B (Prior Art)
FIGS. 1B–1C illustrate operations for driving a conventional LCD panel according to a conventional dot-inversion driving technique.
Figure 1C:
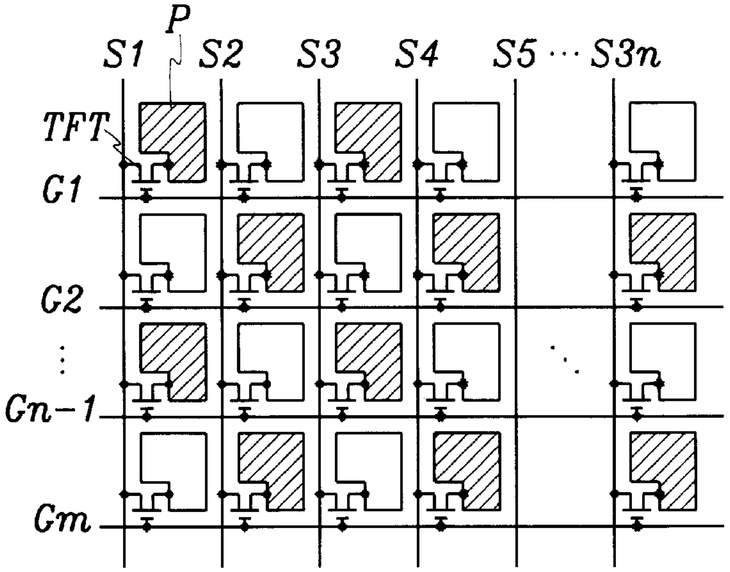
FIG. 1C (Prior Art)
Figure 2:
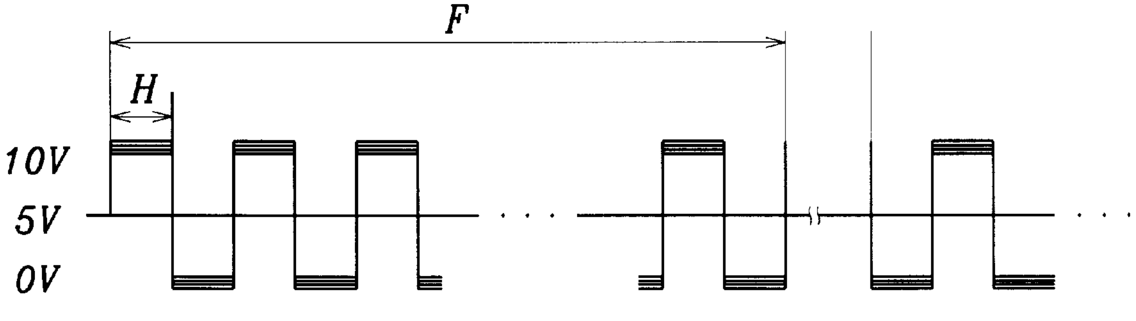
FIG. 2 (Prior Art)
FIG. 2 is a chart illustrating a voltage waveform for a data line driven according to the operations of FIGS. 1B–1C.
Figure 3A:
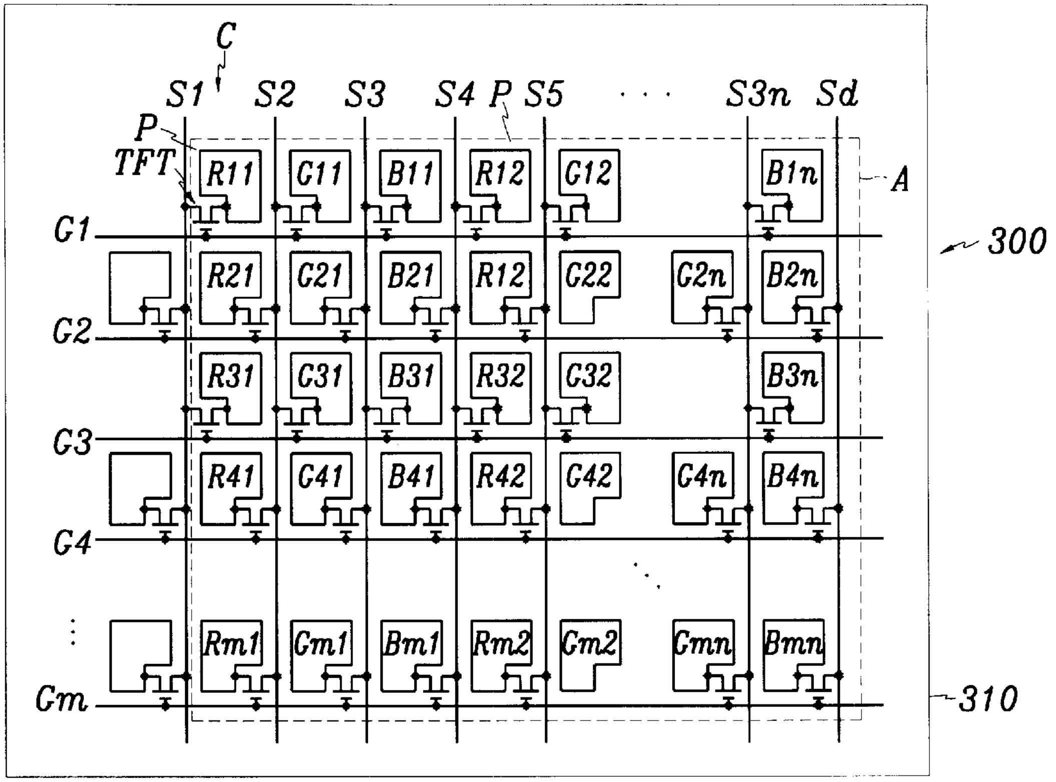
FIG. 3A is a plan view of an LCD panel according an embodiment of the present invention.
Figure 3B:
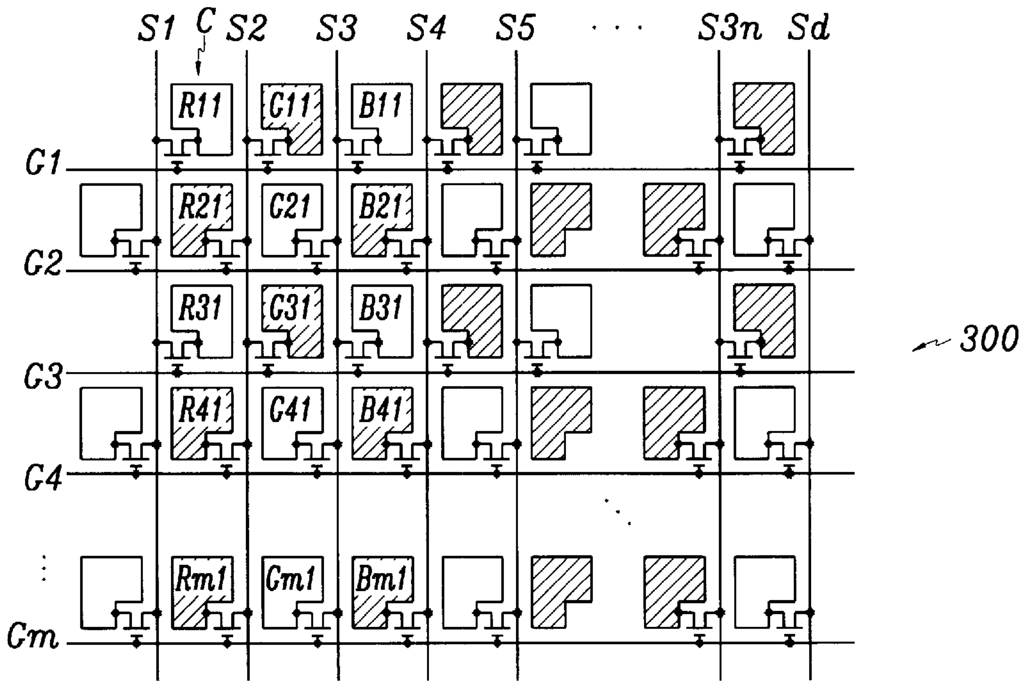
FIGS. 3B–3C illustrate operations for driving an LCD panel according to a dot-inversion driving aspect of the present invention.
Figure 3C:
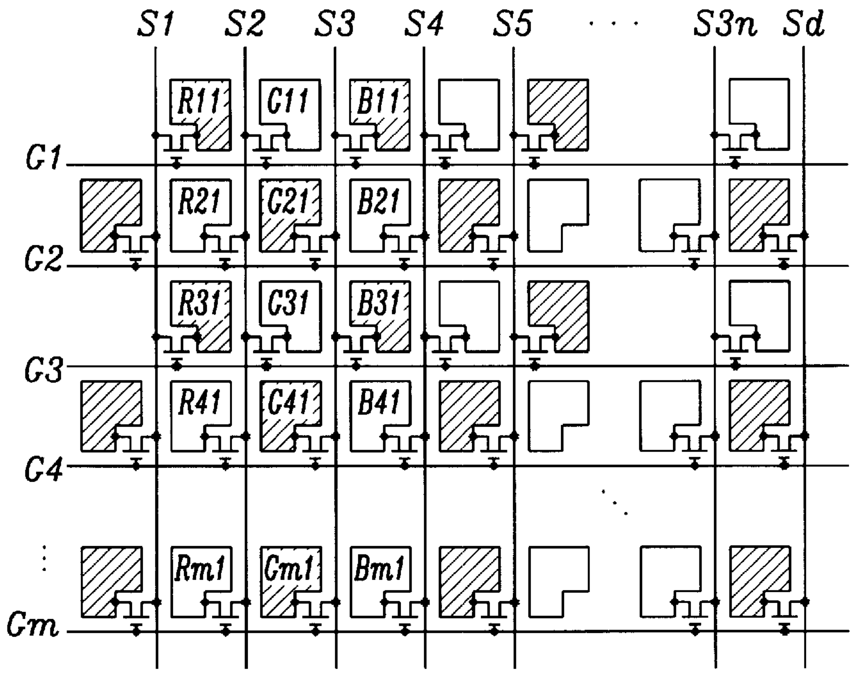

FIGS. 3A to 3C illustrate a preferred embodiment of the present invention. In particular, FIG. 3A provides a plan view of an active matrix LCD panel having m×3n pixels. Parallel gate lines G1–Gm are arranged on a substrate 310. Data lines S1–S3*n*, Sd are arranged perpendicular to the gate lines G1–Gm. The data and gate lines define a matrix of pixel regions P. As illustrated, a pixel region is used to display a red, green or blue component using, for example, a color filter of the appropriate color. Accordingly, a pixel electrode formed within a pixel region P is labeled to indicate a color component the pixel is used to display, e.g., R11, R21, . . . , Rm1, G11, G21, . . . Gm1, B11, B21, . . . , Bm1, . . . . A dummy line Sd is formed at an edge of the effective display area A of the panel 300.

Pixel electrodes in each column of the display are attached to first and second data lines extending on opposite sides of the column; for example, pixel electrodes of a column C are alternately connected to data lines S1, S2 on opposite sides of the column C. As illustrated, connections between the pixel electrodes and the data lines are made via thin-film transistors TFT formed on the pixel regions P. The thin-film transistors TFT each have a first controlled electrode (e.g., a source electrode) connected to a data line, a second controlled electrode (e.g., a drain electrode) connected to a pixel electrode, and a controlling electrode (e.g., a gate electrode) connected to an adjacent gate line. A gate signal applied to the gate line controls application of voltage present at the data line to the associated pixel electrode. Those skilled in the art will appreciate that other techniques for connecting the pixel electrodes to the data lines may be employed with the present invention, such as by using switching devices other than thin-film transistors.

A dot inversion driving aspect according to the present invention will now be described with reference to FIGS. 3B–3C. In particular, FIG. 3B illustrates a first polarity state of the panel 300 during a first frame period, and FIG. 3C illustrates a second polarity state of the panel 300 during a second frame period. Hatching indicates pixel electrodes to which a negative polarity voltage has been applied, while pixel electrodes without hatching represent pixel electrodes to which a positive polarity voltage has been applied. As illustrated, within a given column C of pixel electrodes, alternating pixels electrodes have voltages of alternating polarity applied thereto.

For example, negative voltages for color signal components G11 , R21, G31, R41, . . . , Rm1 are sequentially provided to the data line S2 during a first frame period by sequentially activating the gate lines G1–Gm. Similarly, positive voltages for color signal components B11, G21, B31, G41, . . . , Gm1 are sequentially provided to the data line S3 during the first frame period by sequential activation of the gate lines G1–Gm. As illustrated in FIG. 3C, positive voltages for color signal components G11, R21, G31, R41, . . . , Rm1 are sequentially provided to the data line S2 during a second frame period by sequentially activating the gate lines G1–Gm. Negative voltages for color signal components B11, G21, B31, G41, . . . , Gm1 are sequentially provided to the data line S3 during the second frame period by sequential activation of the gate lines G1–Gm. Because of the nature of the connections between the pixel electrodes of the panel 300, dot-inversion can be achieved without requiring inversion of the polarity of data voltages applied by a given data line during a given frame period.

Figure 4:
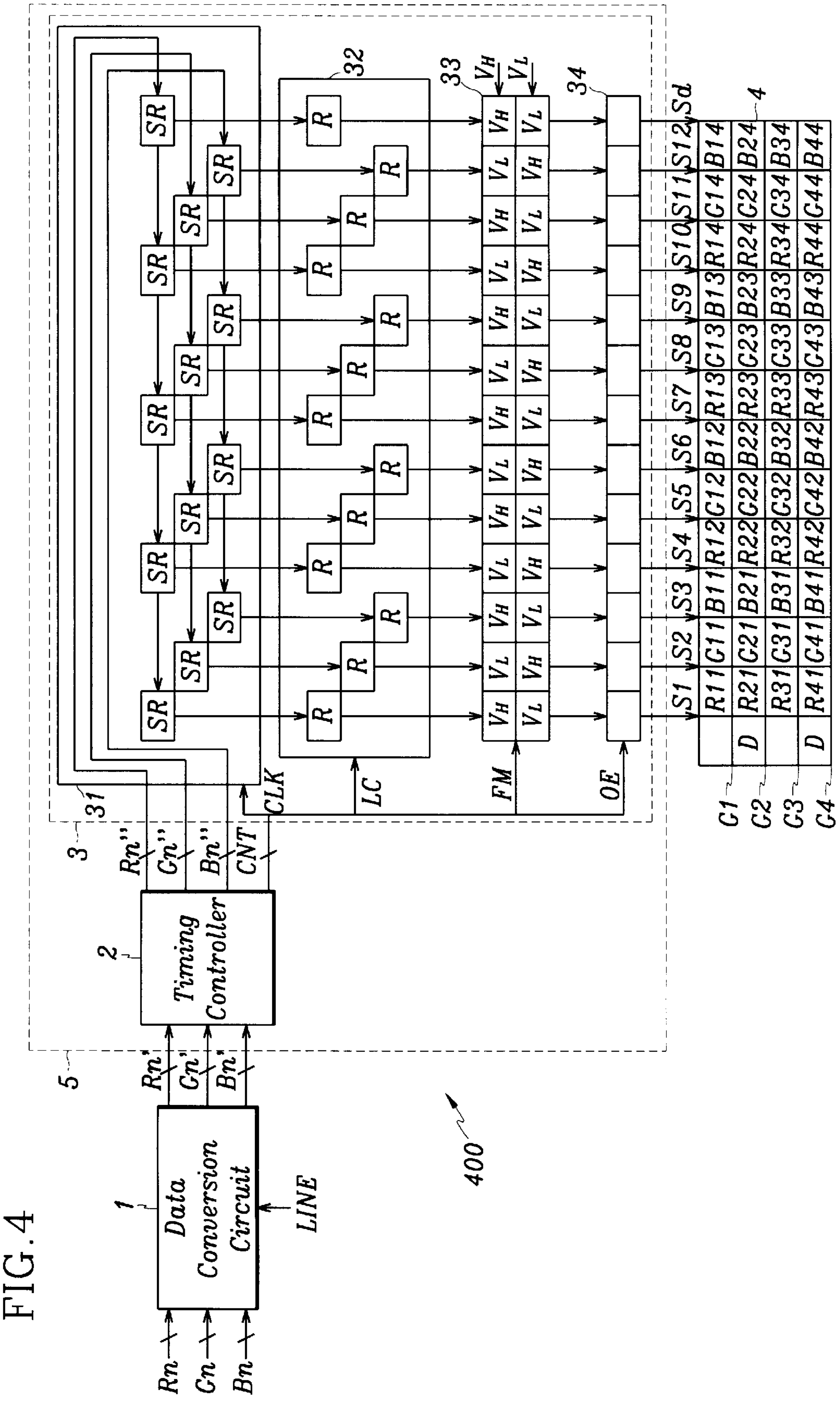
FIG. 4 is a schematic diagram of an LCD device according to an embodiment of the present invention.

FIG. 4 illustrates a controller 400 for driving a liquid crystal panel 4 of the type illustrated in FIGS. 3A–3C. The controller 400 includes a data conversion circuit 1, as well as a driving circuit 5 that includes a timing controller 2 and a source driving circuit 3. As illustrated, the color liquid crystal panel 4 has a resolution of 4×4, and is controlled by four gate lines G1–G4 and thirteen data lines S1–S12, Sd. Each pixel electrode is labeled with a designation R11, R21, . . . , B34, B44 of the color component to be displayed thereby.

Figure 6:
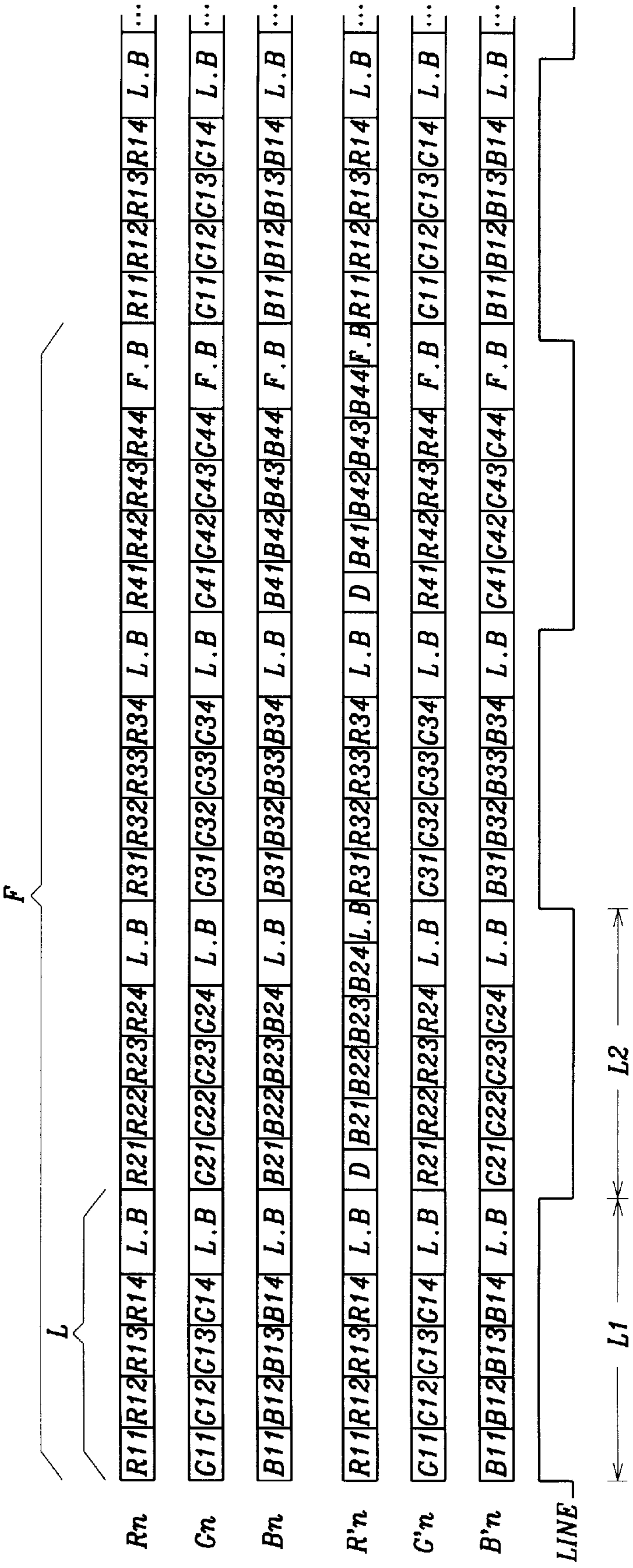
FIG. 6 is a chart illustrating color signal reformatting operations performed by the LCD device of FIG. 4.

The data conversion circuit 1 reformats color signals Rn, Gn and Bn, which preferably are standard format color video signals generated by a graphics controller such as one of the type commonly employed in personal computers. The data conversion circuit 1 produces reformatted color signals Rn', Gn', Bn' that are compatible with the structure of the panel 4, responsive to a line period signal LINE. As illustrated in FIG. 6, the color signals Rn, Gn and Bn each have a serial data format including a line period L including sequences of color values separated by line blanking intervals LB. For example, the red color signal Rn includes color values R11, R12, R13, R14, . . . R41, R42, R43, R44, the green color signal Gn includes color values G11, G12, G13, G14, . . . G41, G42, G43, G44, and the blue color signal Bn includes the color values B11, B12, B13, B14, . . . B41, B42, B43, B44. A frame period F is demarcated by a frame blanking period FB, and includes a plurality of line periods L demarcated by line blanking periods LB, corresponding to transition of the line period signal LINE. The reformatted signals Rn', Gn', Bn' have a similar line and frame period structure, but the arrangement of color values therein are modified such that each of reformatted color signals Rn', Gn', Bn' represents a multiplexing of color values for adjacent columns in the panel 4. In addition, dummy values D are inserted into the color value sequences for the first reformatted color signal Rn', for driving the dummy line Sd.

Figure 5:
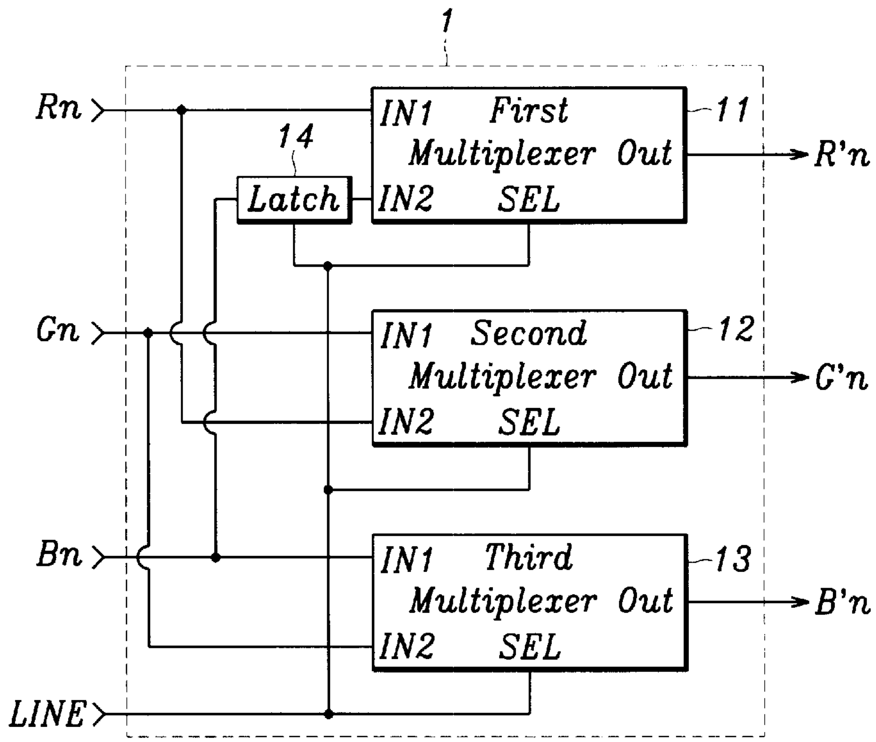
FIG. 5 is a schematic diagram of an exemplary data conversion circuit for use in the LCD device of FIG. 4.

As illustrated in FIG. 5, the data conversion circuit 1 for producing the reformatted color signals Rn', Gn', Bn' includes three multiplexers 11–13, and a latch 14. Each multiplexer 11 to 13 has two input terminals IN1 and IN2, one selection terminal SEL and one output terminal OUT. The color signal Rn and an output terminal signal of the latch 14 are provided to the two input terminals IN1 and IN2 of the first multiplexer 11, respectively. The color signals Gn and Rn are provided to the two input terminals IN1 and IN2 of the second multiplexer 12, respectively. The color signals Bn and Gn are provided to the two input terminals IN1 and IN2 of the third multiplexer 13, respectively. The line period signal LINE is provided to each selection terminal SEL of the multiplexers 11–13. The reformatted color signals Rn', Gn' and Bn' are produced at the output terminals OUT of the multiplexers 11–13.

The line period signal LINE is for indicating horizontal line periods in each color signal, and preferably is an approximate square-wave which inverts between horizontal line periods as illustrated in FIG. 6. In greater detail, each of the multiplexers 11–13 transmits a signal from the input terminal IN1 to the output terminal OUT when the signal at the selection terminal SEL is at a logic high level, and transmits a signal from the input terminal IN2 to the output terminal OUT when the signal at the selection terminal SEL is at a logic low level. During a first line period L1 when the line period signal LINE is high, color values for the first horizontal line of each color signal Rn, Gn and Bn are routed to the output terminals OUT. Consequently, the reformatted signals Rn', Gn', Bn' mirror the input color signals Rn, Gn, Bn during the first line period L1. Near the end of the first line period L1, however, the state of the line period signal LINE is inverted, causing the multiplexers 11–13 to route different signals to the output terminals OUT. Accordingly, during the second line period L2, color values B21–B24 delayed by the latch 14 are transmitted to the output terminal OUT of the first multiplexer 11, color values R21–R24 are transmitted to the output terminal OUT of the second multiplexer 12 and color values G21–G24 are transmitted to the output terminal OUT of the third multiplexer 13.

The reformatted color signals Rn', Gn' and Bn' are conveyed to the timing controller 2. The timing controller 2 produces control signals CNT needed to drive the LCD panel 4, and also produces a buffered reformatted color signals Rn", Gn", Bn" for application to the source driving circuit 3. As illustrated in FIG. 4, the source driving circuit 3 includes a shift register 31, a latch 32, a gray voltage selector 33 and an analog buffer 34. The control signals CNT produced by the timing controller 2 include a clock signal CLK, a latch control signal LC, a frame signal FM and an output enable signal OE. The clock signal CLK is provided to the shift register 31, the latch control signal LC to the latch 32, the frame signal FM to the gray voltage selector 33, and the output enable signal OE to the analog buffer 34.

The shift register 31 has three data transmission paths, each transmission path including a plurality of shift registers SR which are serially connected. The data transmission path for the first buffered reformatted color signal Rn" includes five shift registers. The data transmission paths for the second and third buffered reformatted color signals Gn", Bn" signal line each include four shift registers. The path for the Rn' signal line utilizes an additional shift register due to the presence of the dummy data line Sd. Each data transmission path assigns the color values in the sequence of color values in the buffered reformatted color signals Rn", Gn" , Bn" by shifting the data of each color signal sequentially in response to the clock signal CLK. The output from each shift register is provided to the latch 32. The latch 32, which includes a plurality of registers R, is responsive to the latch control signal LC, latching data at each line period.

The gray voltage selector 33 receives gray voltages $V_H$ and $V_L$ and output signals from the latch 32, and performs gray voltage selection and polarity control operations. The gray voltage selector 33 preferably is a digital-to-analog (D/A) converter that produces an analog output voltage according to a digital signal applied thereto. The positive and negative gray voltages $V_H$, $V_L$ supplied to the gray voltage selector 33 generally have one of a plurality of gray levels, such as 8 or 16 gray levels. The gray voltage selector 33 is preset to produce analog voltages of opposite polarity on adjacent data lines. The polarity of the signal applied to each signal line is inverted each frame according to the frame signal FM. The gray voltage selector 33 selects one gray level from the gray voltage of the appropriate polarity based on a color value received from the latch 32. The voltages produced by the gray voltage selector 33 are stored temporarily in the analog buffer 34, and applied to the data lines S1–S12, Sd in response to an output enable signal OE.

Figure 7:
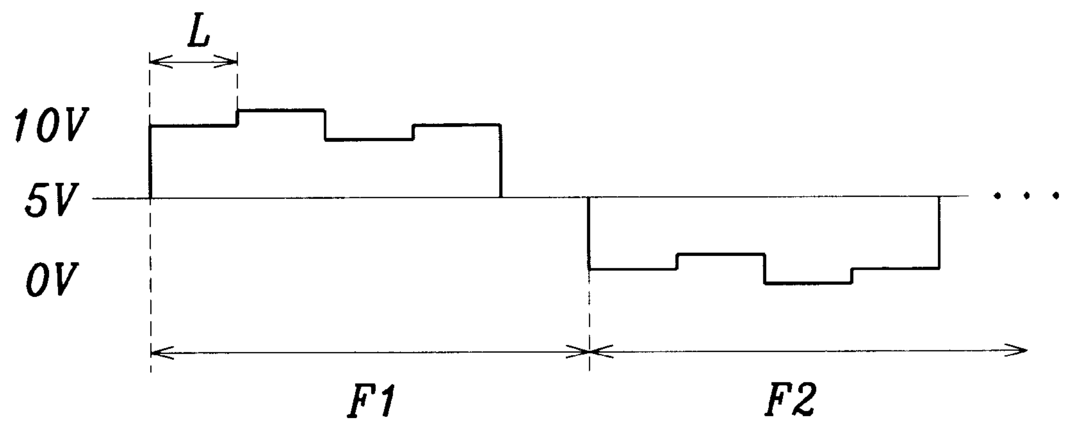
FIG. 7 is a chart illustrating an exemplary data line voltage waveform produced according to aspects of the present invention.

FIG. 7 illustrates an exemplary waveform of one of the analog voltages applied to a data line of the liquid crystal panel 4. During line periods L of a first frame period F1, the data line voltage has a first (positive) polarity with respect to a 5V reference signal. During a second frame period F2, the data line voltage has a negative polarity with respect to the 5V reference.

As described above, the present invention provides an LCD device in which the polarity of data line voltages are inverted each frame period to achieve dot-inversion driving. Because a polarity of the data line voltages does not require inversion at each line period, switching is not required and power consumption may be reduced. In addition, the amplitude of voltage changes in the data line voltages may be reduced, thereby improving display performance.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed is:

1. An LCD device, comprising:

an LCD panel including:

a substrate;

a plurality of parallel gate lines on said substrate;

a plurality of parallel data lines on said substrate, transverse to said plurality of gate lines, said plurality of data lines crossing said plurality of gate lines to define a plurality of pixel regions, said plurality of pixel regions being arranged in a matrix of rows and columns; and a plurality of pixel electrodes on said substrate, a respective one of said pixel electrodes being disposed on a respective one of said pixel regions and electrically connected to a data line such that alternate pixel electrodes on a column of pixel regions are connected to respective ones of first and second data lines disposed on opposite sides of the column; and a controller, responsive to a video signal including a plurality of sequences of video values, a respective one of said sequences of video values representing pixels of a respective frame to be displayed during a respective frame period, said controller operative to generate respective sequences of data line voltages for the frame period on respective ones of said plurality of data lines from the plurality of sequences of video values for the frame period such that the data line voltages applied to a respective one of said plurality of data lines for a frame period have a single polarity and the data line voltages applied to respective adjacent ones of the data lines during the frame period have respective opposite polarities, to thereby operate said LCD panel in a dot inversion fashion, said controller including:

a data conversion circuit, responsive to first, second and third color signals and a line period signal that defines a plurality of line periods, said first, second and third color signals including sequences of first color values, second color values and third color values, respectively, to be displayed during line periods of frame periods, said data conversion circuit producing a plurality of reformatted color signals including:

a first reformatted color signal which includes interleaved sequences of first color values for a first plurality of line periods and third color values for a second plurality of line periods;

a second reformatted color signal which includes interleaved sequences of second color values for the first plurality of line periods and first color values for the second plurality of line periods; and a third reformatted color signal which includes interleaved sequences of third color values for the first plurality of line periods and second color values for the second plurality of line periods; and a driving circuit, responsive to said first, second and third reformatted color signals, which produces data line voltages for driving one of said data lines from one of said first, second and third reformatted color signals, the data line voltages applied to the one data line having the same polarity during a frame period.

2. A device according to claim 1, wherein said driving circuit comprises:

a timing controller which produces buffered first, second and third reformatted color signals, a clock signal, a latch control signal, a frame signal and an output enable signal from the first, second and third reformatted color signals;

a shift register circuit, responsive to the buffered first, second and third reformatted color signals and to the clock signal, which includes first, second and third sequences of shift registers which sequentially shift color values of said buffered first, second and third reformatted color signals responsively to said clock signal to produce a plurality of shifted color signals, a respective one of which corresponds to a respective one of said data lines of said LCD panel;

a latch, responsive to said plurality of shifted color signals, which latches color values in said plurality of shifted color signals responsively to said latch control signal to produce a plurality of latched color signals, a respective one of which corresponds to a respective one of said data lines of said LCD panel;

a gray voltage selector, responsive to said plurality of latched color signals, which produces a plurality of data line voltages responsive to said plurality of latched color signals and to said frame signal, a respective one of said data line voltages corresponding to a respective one of said data lines of said LCD panel and having a voltage level selected from a plurality of gray levels and a polarity determined by the state of said frame signal; and an analog buffer, which receives said plurality of data line voltages and applies the plurality of data line voltages to the plurality of data lines of said LCD panel responsive to said output enable signal.

3. A device according to claim 1, wherein said data conversion circuit comprises:

a latch having an input terminal which receives said third color signal and a clock input terminal which receives said line period signal, and which produces a delayed third color signal therefrom;

a first multiplexer having a first input terminal which receives said first color signal, a second input terminal which receives said delayed third color signal, and a select terminal which receives said line period signal, and which produces said first reformatted color signal therefrom;

a second multiplexer having a first input terminal which receives said second color signal, a second input terminal which receives said first color signal, and a select terminal which receives said line period signal, and which produces said second reformatted color signal therefrom; and a third multiplexer having a first input terminal which receives said third color signal, a second input terminal which receives said second color signal, and a select terminal which receives said line period signal, and which produces said third reformatted color signal therefrom.

4. In an LCD panel including a plurality of pixel electrodes connected to a plurality parallel data lines such that alternate pixel electrodes of a column of the pixel electrodes are connected to respective ones of first and second data lines disposed on opposite sides of the column of pixel electrodes, a method of operating comprising the step of:

generating respective sequences of data line voltages for a frame period on respective ones of the plurality of data lines such that the data line voltages applied to a respective one of the plurality of data lines for a frame period have a single polarity and the data line voltages applied to respective adjacent ones of the data lines during the frame period have respective opposite polarities, to thereby operate said LCD panel in a dot inversion fashion, wherein said step of generating respective sequences of data line voltages for a frame period on respective ones of the plurality of data lines includes the steps of:

providing first, second and third color signals and a line period signal that defines a plurality of line periods, said first, second and third color signals including sequences of first color values, second color values and third color values, respectively, to be displayed during line periods of frame periods;

producing a plurality of reformatted color signals from said first, second and third color signals and said line period signal, said plurality of reformatted color signals including:

a first reformatted color signal which includes interleaved sequences of first color values for a first plurality of line periods and third color values for a second plurality of line periods;

a second reformatted color signal which includes interleaved sequences of second color values for the first plurality of line periods and first color values for the second plurality of line periods; and a third reformatted color signal which includes interleaved sequences of third color values for the first plurality of line periods and second color values for the second plurality of line periods; and driving one of said data lines from one of said first, second and third reformatted color signals, the data line voltages applied to the one data line having the same polarity during a frame period.

* * * * *